United States Patent [19]

Apperson et al.

[11] 4,449,010

[45] May 15, 1984

[54] INSULATOR GUARD

[75] Inventors: Kenneth P. Apperson, Chaulkville; Cecil D. Morgan, Centerpoint, both of Ala.

[73] Assignee: Hastings Fiber Glass Products, Inc., Hastings, Mich.

[21] Appl. No.: 424,942

[22] Filed: Sep. 28, 1982

[51] Int. Cl.³ .................... H02G 1/02; H01B 17/00
[52] U.S. Cl. ................................ 174/5 R; 403/122
[58] Field of Search .............. 174/5 R, 136, 139; 285/160, 166, 167; 403/56, 76, 90, 122

[56] References Cited

U.S. PATENT DOCUMENTS 2,430,703  11/1947  Bowen .......................... 174/5 R

FOREIGN PATENT DOCUMENTS 716169  10/1931  France ......................... 174/5 R

*Primary Examiner*—Laramie E. Askin
*Attorney, Agent, or Firm*—Flynn, Thiel, Boutell & Tanis

[57] ABSTRACT

An apparatus for providing a guard against electrical shock near an insulator carrying an energized, exposed conductor. In particular, this apparatus is intended for providing protection from electrical shock by providing a slotted insulator cover having means for moveably coupling a line guard thereto, said coupling means comprising a slotted ball and socket arrangement connected to the insulator cover and having a line guard adapter secured to the moveable portion of the ball and socket arrangement. By varying the degree to which the socket covers the ball, the degree of movement of the line guard adapter is defined. By closely fitting the socket to the ball, the insulator cover can be secured to the insulator by disaligning the slotted portions of the ball and socket.

11 Claims, 7 Drawing Figures

INSULATOR GUARD

BACKGROUND OF THE INVENTION

This invention relates to devices for protection from electric shock and more particularly to devices which guard against electric shock from live conductors supported by utility poles.

In the electrical power distribution field cylindrical insulators known as fixed post insulators are mounted to vertical wooden poles and carry electrically energized, non insulated, cable conductors. The insulators and conductors are often mounted at different angles to the pole depending on how the conductor is to be carried by the pole and its relationship to other conductors carried by the pole. Many times a plurality of conductors are carried on a single pole, each conductor being supported by an individual, cylindrical, fixed post insulator. A typical arrangement would comprise two opposing insulators mounted near the top of the pole and at right angles to the pole with a third insulator mounted along the vertical axis of the pole at the top of the pole. Each insulator would carry a live conductor, each conductor being in parallel relation to the others. Another typical arrangement would comprise two insulators mounted to the pole at less than right angles and inclined upward. Each would carry an energized conductor. Also, insulators are often hung from horizontal arms of a vertical pole with the conductor carried at the bottom of the insulator. These are known as suspension insulators. This arrangement allows the insulator and conductor flexibility independent of the pole in high velocity winds.

When repair work is required to be done on the pole or on the insulators or conductor cable near the pole, a means for preventing electrical shock to repair personnel from the live conductors is needed. In the past, elongated conductor guards, called line guards, have been used to cover the conductor up to the point of the conductor's connection to the insulator post. If the lineman is using only the elongated conductor guards, a section of live conductor is left exposed at the insulator. This leaves a risk of electric shock to the lineman who is working at or near the area of the fixed post insulator.

Insulator covers have been devised which will cover the conductor at the area of its connection to the insulator. These have primarily been of the type which will fit over the insulator post and will allow a line guard to overlap it at each end to provide a continuous area of protection around the area of the insulator. Many of these insulator covers can be used to cover either a vertical or a horizontal fixed post insultor.

Most conductors are made of elongated wire cable which has a certain degree of flexibility. This flexibility is desirable as it allows the cable to flex in a strong wind, preventing damage to the utility poles. However, this flexibility also allows the cable to sag somewhat towards the ground. A standard line guard, even when it overlaps a traditional insulator guard is often not secured to a fixed point, but can slip or "follow the sag" of the cable. This slippage could unexpectedly expose a section of live conductor to the lineman working on a cable. Standard insulator covers do not have the flexibility to accommodate a sagging conductor and will not mate well with a line guard placed over a sagging conductor. Thus, the junction between the line guard and the insulator cover may be broken unexpectedly, exposing a live section of the conductor to repair personnel.

Standard insulator guards are not secured to either the pole, insulator or conductor. They are merely placed over the insulator and conductor and are held in place by gravity. Since the insulator guard is not secured to the insulator or conductor, it may be accidentally removed or jostled out of place by repair personnel causing an unexpected electrical hazard. Also, the insulator must be mounted to the pole at such an angle that gravity will not cause it to slip off.

Utility poles and their conductors usually are routed along roadways. Many times there are curves or turns in the road, which the poles and conductors follow. Thus, a conductor may not always be routed linearly. The conductor may be routed from one utility pole to another which is not in a direct line with the previous poles, causing the conductor to form an angle or curve from the previously routed conductor. Traditional insulator covers are generally rigid and are not able to adapt to curves in the conductor. Thus, they will not mate well with a line guard placed over a conductor that curves or angles from the pole. In such cases there is a greater risk of accidentially exposing a section of live conductor at the point where the insulator guard and the line guard mate.

When repair work needs to be done on a suspension type insulator, standard insulator covers will not be acceptable since they will not be able to be inverted and placed over the insulator. Through gravity they will fall off of the insulator or will have to be secured to the insulator by some other means.

Thus, there is a need in the field for an insulator guard which will cover a fixed post insulator or a suspension type insulator without regard to the angle of the insulator to the utility pole. Also, there is a need for an insulator guard which will mate with a standard line guard to insure an uninterrupted, insulated work area for repair personnel. Further, there is a need for an insulator cover which will accommodate a sagging or curved conductor and which will form a secure junction with a standard line guard placed over the sagging or curved conductor. Also, there is a need for an insulator guard which can be secured in position over the insulator and conductor (whether it be of the fixed post type or the suspension type) to prevent the cover from being accidentally removed from the insulator or from slipping off of the insulator to provide a safer, more risk free working area near the fixed post insulator.

SUMMARY OF THE INVENTION

It is an object of our invention to provide an insulator guard which will cover an insulator post and the attached conductor without regard to the angle of the insulator post to the utility pole.

Another object of the invention is to provide a fixed post insulator guard which will accommodate a sagging or curved conductor and will form a secure junction with a standard line guard placed over a sagging or curved conductor.

A further object of the invention is to provide an insulator guard which can be secured in position over the insulator and conductor (whether of the fixed post or suspension types) to prevent the cover from being accidentally removed from the insulator or from slipping off of the insulator to provide a safer, more risk free working area near the fixed post insulator.

Further objects and advantages of the invention will become apparent in the following description. The features of novelty which characterize the invention will be pointed out with particularity in the claims annexed to and forming a part of this specification.

The above objectives are achieved by providing a cylindrical cover of a dielectric material of such a dimension that it will easily slip over the fixed post insulator. The cylindrical cover has opposing slots along its length which allow the cover to receive the cable conductor which is connected to the insulator post. Connected over each slot in the cover is a hollow ball having a moveable socket fitted thereon. Each of the hollow balls is also slotted in line with the slotted cylindrical cover to receive the conductor. Each of the moveable sockets has a slotted portion which may be aligned with the slots in the ball and cylindrical cover. At the outermost end of each socket is an adapter section which is connectable with a standard line guard such as manufactured by the Square D Company of Helena, Ala.

Since standard line guards always cover a conductor such that their underside is open to the ground, the adapter section of the socket which mates with the line guard must also be orientable such that its open end is oriented to the ground. The ball and moveable socket arrangement of the insulator cover allow the insulator cover to connect with a standard line guard regardless of the angle of the insulator to the utility pole. Thus, one insulator guard with this ball and socket arrangement can be used on a wide variety of fixed insulator post arrangements.

When the insulator guard is joined with a standard line guard on each side, a large, shock-free working area is provided around the insulator post area. The adapter section of one of the sockets can be designed to mate with a female end of a standard line guard while the other adapter section can be designed to mate with the male end of the standard line guard.

The socket does not entirely cover the ball, but leaves a section of the ball uncovered near the joinder of the ball to the insulator cover. By leaving a predetermined section of the ball uncovered by the socket, the socket is able to enjoy universal movement with respect to the ball. An approximate 15° degree area of movement is felt to be the optimum to enable the insulator guard to adapt to a sagging conductor or a conductor that is turned at an angle from the insulator post. Since the line guard adapter is attached to the socket, this movement of the socket allows the insulator guard to accommodate a line guard placed over a sagging or curved conductor.

After the insulator guard has been installed over an insulator post which does not have its central axis parallel to the central axis of the pole, the socket will be rotated such that the line guard adapter is oriented downward to the ground. Once the slotted portion of the socket is disaligned with the slotted portion of the ball and cover, the insulator guard is locked to the insulator post and conductor. This feature prevents the insulator guard from being accidentally removed. By manufacturing the socket and ball to close tolerances, a frictional fit between the socket and ball can be accomplished which will keep the socket in the locked position without regard to the position of the insulator cover.

The insulator guard is installed on the insulator by a standard "hot stick" device. By connecting the hot stick to an adapter on the cylindrical cover and aligning all of the slots, the insulator guard is able to be placed over the insulator post and conductor. The socket is then rotated to disalign the slots of the ball and socket to lock the cover to the insulator, thereby preventing accidental removal. Removal of the insulator guard is accomplished by connecting the same hot stick to the cover and realigning the slots of the socket with those of the ball and cover. Once realigned, the insulator guard may then be removed from the insulator post and conductor.

An alternate embodiment of the above description would involve fixing the socket to the insulator cover and allowing the ball to move about freely therein. The outer section of the socket would be left open, exposing a portion of the moveable ball. On the exposed part of the ball the adapter for the line guard would, be attached. Each of the socket, moveable ball and adapter would be slotted to receive the cable conductor and would allow the insulator guard as much flexibility as the earlier mentioned embodiment.

Other features of this invention will appear from the following detailed description taken in conjunction with the accompanying drawings.

BRIEF DESCRIPTION OF THE DRAWINGS

The features of the present invention which are believed to be novel are set forth with particularity in the appended claims. The invention, together with further objects and advantages may best be understood by reference to the following description taken in conjunction with the accompanying drawings, in several figures of which like reference numerals identify like elements, and in which:

DETAILED DESCRIPTION

Figure 1:
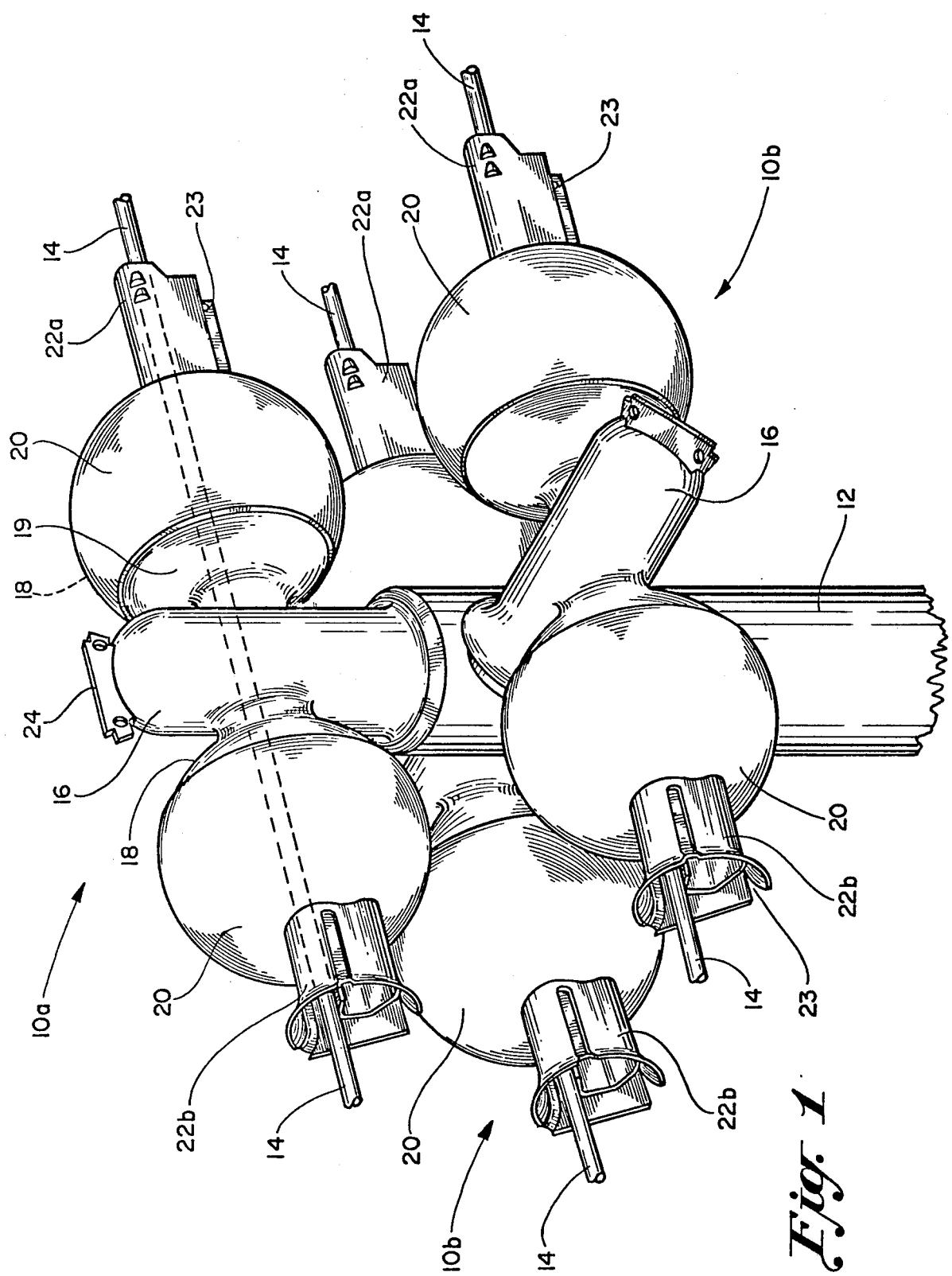
FIG. 1 is a perspective view of the top and side portions of a utility pole with an insulator guard in position over a vertical fixed post insulator at the top of the pole and with two insulator guards in position over two horizontal fixed post insulators adjacent the top of the pole.

In general terms, this invention involves apparatus for use in preventing electrical shock or exposure to live electrical wires to line personnel working at or near an insulator on a utility pole. FIG. 1 illustrates insulator guards 10 (see FIG. 2) placed in three positions over fixed post insulators on a utility pole. The vertical insulator guard 10a and the two horizontal insulator guards 10b are placed over utility pole 12 with conductors 14 shown extending from each end of the insulator guards, all in parallel relation to each other. Referring to insulator guard 10a, it is seen that cylindrical cover 16 is placed over a fixed post insulator (not shown in FIG. 1). Connected to each side of cylindrical cover 16 are hollow balls 18. Fitted over each hollow ball is socket 20 leaving a predetermined area of hollow ball 18 exposed to allow for movement of socket 20 with respect to ball 18. Connected to each of the outer ends of sockets 20 are line guard adapters 22a and 22b. Line guard adapter 22a is a male adapter and connects with a female end of a standard line guard (not shown). Line guard adapter 22b is a female adapter able to adapt and connect with the male end of a standard line guard (not shown).

It is seen that conductors 14 pass through the approximate center of the hollow balls 18 and cylindrical cover 16. This helps position the insulator guard so that a predetermined distance can be maintained between the live conductor 14 and the majority of the insulator guard 10. This distance facilitates the insulative properties of the insulator guard through maintaining predetermined amount of air insulation between the insulator guard and the live conductor.

FIG. 1 also illustrates a "hot stick" adapter 24 which will connect with a standard hot stick to enable the insulator guard 10 to be inserted or removed without actual contact by repair personnel.

Figure 2:
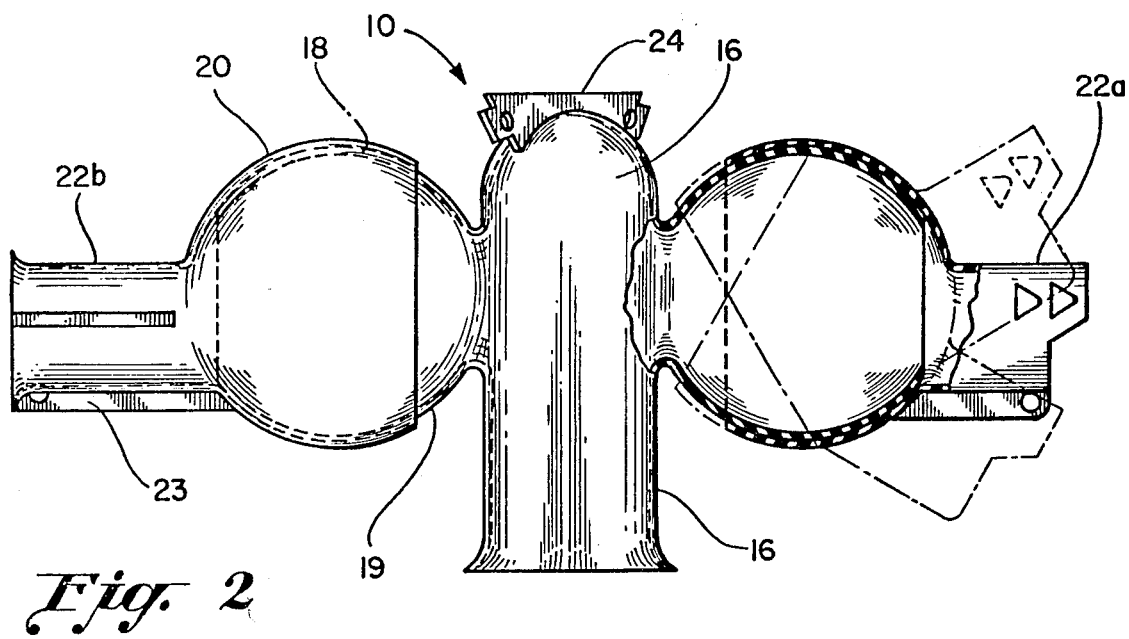
FIG. 2 is a front elevational and partial sectional view of the insulator guard with one of the sockets shown in various positions with respect to the guard.

FIG. 2 illustrates in partial section view the relationship between socket 20 and hollow ball 18. It is seen that socket 20 by virtue of the exposed area of hollow ball 18 is able to move approximately 15 degrees on each side of the horizontal through a vertical plane. It can be seen in FIG. 2 that hollow ball 18 is integrally formed to cylindrical cover 16 such that it forms a permanent and unmoveable element of insulator guard 10. Hot stick adapter 24 is shown in FIG. 2 affixed directly atop cylindrical cover 16; however, it may be attached in alternative embodiments to any portion of the insulator guard 10 which would facilitate convenient placement and removal of insulator guard 10 over the insulator. Although not shown in FIG. 2, socket 20 to which adapter 22b is connected also moves in a similar arc as shown for socket 20 having line guard adapter 22a connected thereto.

While the open area 19 of hollow ball 18 is variable, the area may not exceed that which is necessary to provide a restraining element on socket 20. By varying the amount of area 19 left uncovered by socket 20, the degree of flexibility of socket 20 with respect to ball 18 can be controlled. FIG. 2 only illustrates movement of socket 20 in a vertical plane. It should be understood that such movement is not limited only to the vertical plane, socket 20 may move in any direction with respect to ball 18, within the limits allowed by open area 19.

Figure 3:
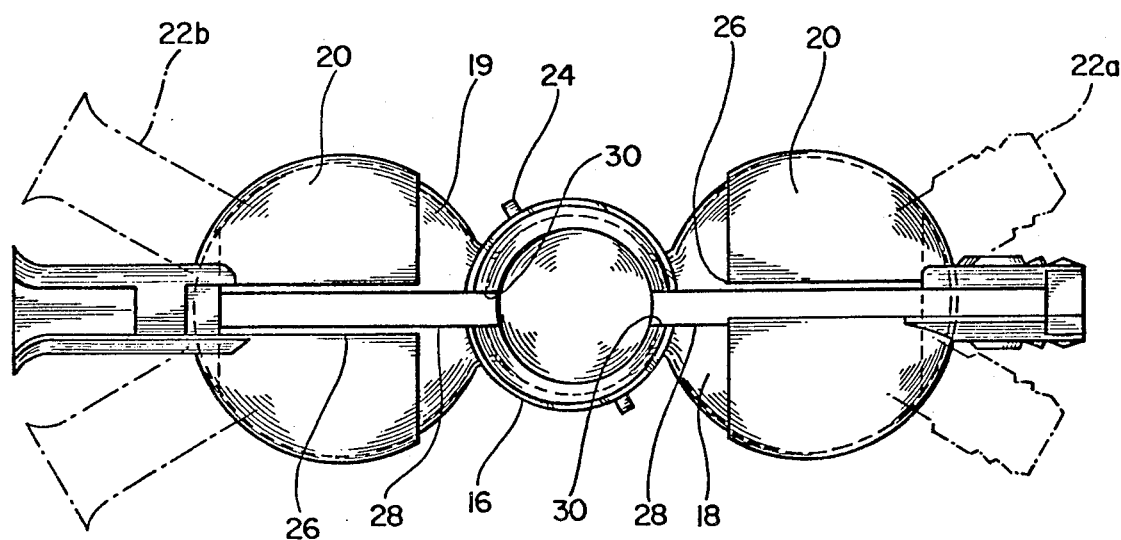
FIG. 3 is a bottom view of the insulator guard.

FIG. 3 illustrates the bottom view of insulator guard 10 and illustrates the slots contained in the insulator guard for receiving the conductor as the insulator guard is placed over the insulator. Socket 20 has slot 26 which may be aligned with slot 28 of hollow ball 18. Slot 28 is coextensive with slot 30 in cylindrical cover 16. FIG. 3 illustrates that socket 20 may move with respect to ball 18 within the limits of open area 19, in a horizontal plane. Thus, insulator guard 10 may be used on a curved conductor (or a conductor that curves on an angle from its connection with the insulator post) by virtue of the ability of socket 20 to move independently of fixed hollow ball 18. Since the line guard adapters 22a and 22b are secured to sockets 20, socket 20's movement is also the movement of the line guard adapters 22a and 22b. Therefore, either of the line guard adapters 22a and 22b will be able to mate with a standard line guard on a sagging or a curved conductor.

It should be noted that socket 20 is free to rotate about the conductor cable. This rotation is independent of hollow ball 18 and cylindrical cover 16 and allows socket slot 26 to be disaligned with hollow ball slot 28. This disalignment will lock insulator guard 10 onto the insulator and conductor after it is installed. This locking feature prevents accidental removal of the insulator guard 10 from the utility pole and insulator post without regard to the angle of the insulator to the post. Such a feature presents a much safer working area to repair personnel with a reduced risk of accidental exposure of live conductors.

Figure 4:
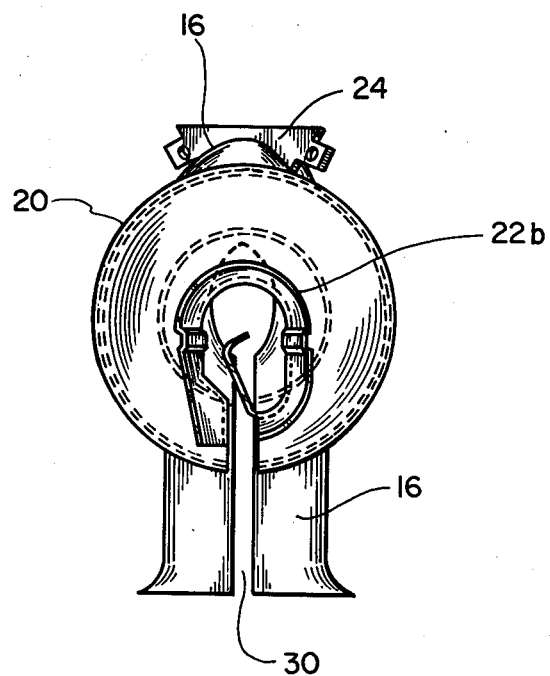
FIG. 4 is a side elevational view of the female end of the insulator guard.

FIG. 4 illustrates a side view of insulator guard 10 and shows in detail the arrangement of the female line guard adapter 22b. FIG. 4 also illustrates insulator guard 10 having cylindrical cover slot 30 and hollow ball slot 28 aligned with socket slot 26. In this position, insulator guard 10 may be inserted or removed from a fixed post insulator simply by attaching a standard hot stick to hot stick adapter 24. The line guard adapters 22a and 22b are made of a somewhat flexible material which will allow the line guard adapter to be removed from the conductor by simply pulling the insulator guard off of the insulator.

Figure 5:
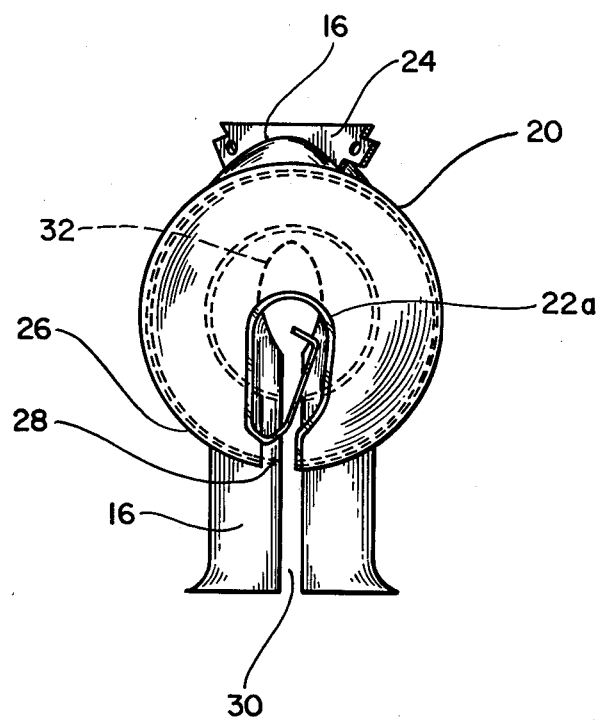
FIG. 5 is a side elevational view of the male end of the insulator guard.

FIG. 5 illustrates a side view of insulator guard 10 and depicts the arrangement of male line guard adapter 22a. Oval section 32 is formed by the joinder of the hollow ball 18 with the cylindrical cover 16. FIGS. 4 and 5 illustrate the placement of line guard adapters 22a and 22b such that the top of the adapters will rest on conductor 14 thereby maintaining the conductor 14 at about the center point of insulator guard 10.

Use of insulator guard 10 on a suspension type insulator which is normally hung upside down is accomplished by placing the insulator guard 10 over the suspension insulator and rotating socket 20 with respect to ball 18 such that slot 28 is disaligned from slot 26. By manufacturing slot 20 such that it will have a close tolerance with respect to its fit over hollow ball 18, a frictional movement can be established by which socket 20 will remain in the position to which it is moved with respect to ball 18. Since the suspension insulator is normally hung upside down with the conductor at the bottom of the insulator, placement of the insulator guard over the suspension insulator would require movement of socket 20 so that the open ends 23 of the line guard adapters 22a and 22b are facing the ground. This feature facilitates the placement and connection of standard line guards to the insulator guard.

Since the standard line is placed on the conductor such that its open end is towards the ground, the feature of rotating the socket 20 with respect to the ball when connected to a suspension insulator accomplishes two functions. First, it locks the insulator guard 10 to the insulator and conductor thereby preventing accidental removal. Second, it positions the line guard adapters 22a and 22b such that they may always have their open ends 23 facing the ground and are thus able to be connected with a standard line guard. It should be noted that the flexibility of socket 20 in the horizontal and vertical planes by virtue of open area 19 is still maintained when in use with a suspension type insulator. Thus, insulator guard 10 will accommodate a sagging or curved conductor even when connected to a suspension type insulator.

By controlling the positioning of line guard adapters 22a and 22b and maintaining the conductor 14 at approximately the center of hollow balls 18 and cylindrical cover 16, an appropriate air gap is maintained between the live conductor 14 and the components of insulator guard 10. As is well known in the art, air gap insulation is an effective means of preventing arcing and other electrical flow through insulation material. In the best mode, insulator guard 10 is made of a semi-rigid or rigid dielectric material which will resist the influence of a brushing type contact by line personnel and will maintain the integrity of the air gap insulation built into the insulator guard 10 by virtue of placement of adapters 22a and 22b. It should be noted that when used with a suspension type insulator, this air gap insulation is maintained since socket 20 and hence adapters 22a and 22b are rotating 180 degrees at or about the center of hollow balls 18.

Figure 6:
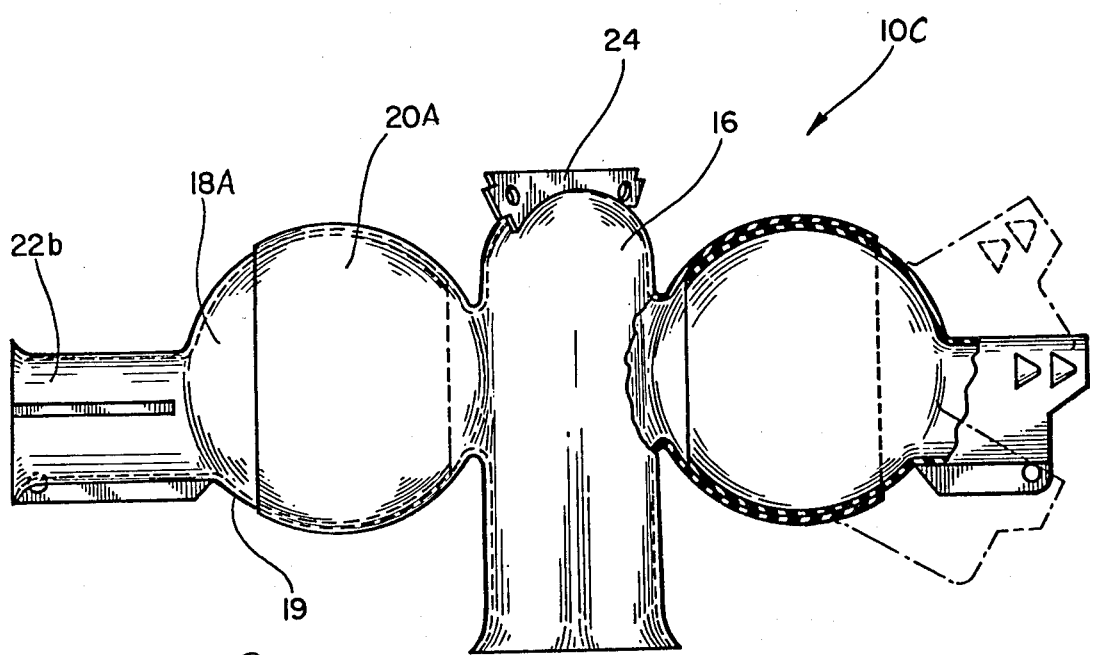
FIG. 6 is a front elevational view of an alternate embodiment of the insulator guard.
Figure 7:
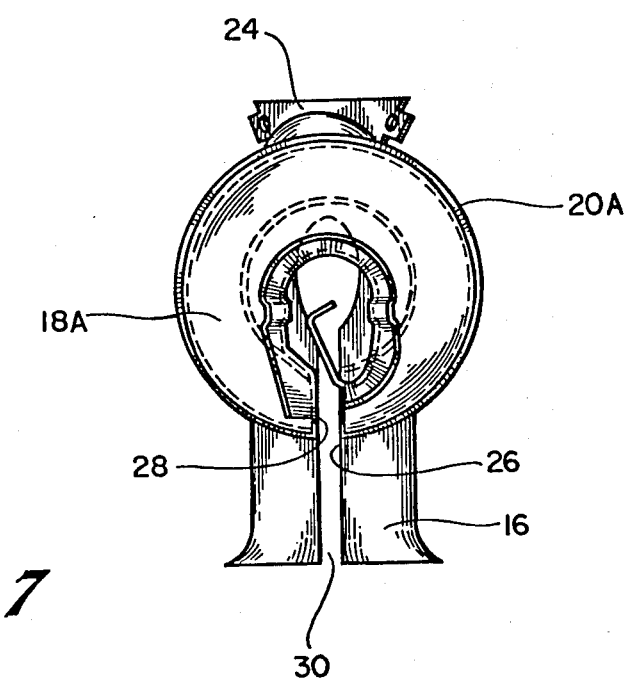
FIG. 7 is a side elevational view of the alternate embodiment of FIG. 6.

An alternate embodiment of the above described invention is shown in FIGS. 6 and 7. Socket 20A is permanently fixed or integrally molded to cylindrical cover 16 with moveable hollow ball 18A contained therein. Socket 20A does not entirely cover the moveable hollow ball 18A thereby leaving open area 19 at the outermost ends of the insulator guard 10C. Adapters 22a and 22b are connected to each hollow ball 18A of the insulator guard 10C. This arrangement will provide the same flexibility (as illustrated in FIG. 6) as above described with respect to the line guard adapters. Socket 20A, ball 18A, and cylindrical cover 16 have the same slots 26, 28, and 30, respectively, as the earlier described embodiments, as illustrated in FIG. 7. By rotating the ball 18A within the fixed socket, the respective slots can be disaligned to lock the insulator guard to the insulator and conductor. Also, the movability of the ball by virtue of open area 19 will allow the guard 10C to adapt to sagging or curved conductors.

A further alternate embodiment of the above described invention would consist of an arrangement of the cylindrical cover 16 as shown, however, the hollow balls 18 could be shaped into a cylindrical shape having an outer raised rib to allow rotation of a mating socket. While this arrangement would not allow the flexibility of the above described invention, it would allow movement of the socket with respect to the cylindrical cover and it could still retain the locking features of the above described invention with a less expenditure of materials.

The above described invention is not limited to the particular details of the apparatus depicted and other modifications and applications are contemplated. Certain other changes may be made in the above described apparatus without departing from the true spirit and scope of the invention involved herein. It is intended, therefore, that the subject matter described above shall be interpreted as illustrative and not in a limiting sense.

We claim:

1. An insulator guard adapted to cover an overhead line insulator and the adjacent portions of an energized exposed conductor mounted on said insulator, whereby to provide protection against electrical shock, comprising: a hollow insulator cover made of electrical insulating material and adapted to cover the overhead line insulator, said cover having a substantially cylindrical sidewall and being open at one end thereof, said sidewall having a pair of opposed slots extending axially from said open end of said cover partway along the length of said sidewall, said slots being adpated to receive the conductor therethrough; a pair of hollow ball-and-socket joints made of electrical insulating material, said ball-and socket joints being disposed on opposite sides of said sidewall and extending laterally outwardly from said sidewall at locations adjacent to the axially inner ends of said slots in said sidewall, respectively, both of said ball-and-socket joints comprising a hollow ball part and a hollow socket part, one of which parts is fixedly mounted on said sidewall and the other of which parts is interfitted with said one part so as to be capable of rotary motion with respect to said cover and said one part in every direction, said one part of said joint having a slot laterally aligned and communicating with the inner end of the associated slot in said sidewall of said cover and extending laterally outwardly therefrom so that the conductor can be received therethrough, said other part of said joint having a laterally outwardly extending slot which is alignable with said slot in said one part of said joint and with said slot in said sidewall of said cover so that the conductor can be received therethrough whereby the portions of said conductor that are adjacent to said cover can be received inside said joints, said other part of each of said joints being rotatable with respect to said one part thereof to move the slot of said other part out of lateral alignment with the slot of said one part whereby to releasably lock said guard on the insulator and the conductor and to completely encircle portions of the conductor; and a pair of line guard adapters each attached to the laterally outer end of said other part of one of said joints and adapted to be moved with said other part.

2. The insulator guard of claim 1 in which said one part of both of said joints is the ball part thereof and said other part of both of said joints is the socket part thereof.

3. The insulator guard of claim 2 wherein said socket part covers less than the entire surface area of said ball part, with a predetermined amount of the surface area of said ball part being exposed adjacent to said insulator cover.

4. The insulator guard of claim 2 wherein said socket part is closely fitted over said ball part such that a frictional fit is maintained between said socket part and said ball part.

5. The insulator guard of claim 2 wherein said insulator cover and said ball-and-socket joints are made of a rigid material, and said ball-and-socket joints each have an enlarged, spherical, internal cavity so that the walls of said ball part and said socket part are spaced predetermined distances from said energized conductor such that said conductor is further insulated by air from accidental contact.

6. The insulator guard of claim 1 in which said one part of both of said joints is the socket part thereof and said other part of both of said joints is the ball part thereof.

7. The insulator guard of claim 6 wherein a selected amount of the surface area of said ball part is exposed, and the amount of movement of said ball part with respect to said socket portion is determined by said exposed area.

8. The insulator guard of claim 6 wherein said socket part is closely fitted over said ball part such that a frictional fit is maintained between said socket part and said ball part.

9. The insulator guard of claim 6 wherein said insulator cover and said ball-and-socket joints are made of a rigid material, and said ball-and-socket joints each have an enlarged, spherical, internal cavity so that the walls of said ball part and said socket part are spaced predetermined distances from said energized conductor such that said conductor is further insulated by air from accidental contact.

10. An insulator guard as claimed in claim 1 in which said hollow ball part is a major portion of an enlarged hollow sphere and said hollow socket part is a major portion of an enlarged hollow sphere, the spherical external wall of said ball part being in sliding contact with the spherical internal wall of said socket part.

11. An insulator guard adapted to cover an overhead line insulator and the adjacent portion of an energized exposed conductor mounted on said insulator, whereby to provide protection against electrical shock, comprising: a hollow insulator cover made of electrical insulating material and adapted to cover the overhead line insulator, said cover having a substantially cylindrical sidewall and being open at one end thereof, said sidewall having a slot extending axially from said open end of said cover partway along the length of said sidewall, said slot being adapted to receive the conductor therethrough; a hollow ball-and-socket joint made of electrical insulating material, said ball-and-socket joint extending laterally outwardly from said sidewall at a location adjacent the axially inner end of said slot in said sidewall, said ball-and-socket joint comprising a hollow ball part and a hollow socket part, one of which parts is fixedly mounted on said sidewall and the other of which parts is interfitted with said one part so as to be capable of rotary motion with respect to said cover and said one part in every direction, said one part of said joint having a slot laterally aligned and communicating with the inner end of the slot in said sidewall of said cover and extending laterally outwardly therefrom so that the conductor can be received therethrough, said other part of said joint having a laterally outwardly extending slot which is alignable with said slot in said one part of said joint and with said slot in said sidewall of said cover so that the conductor can be received therethrough whereby a portion of said conductor that is adjacent to said cover can be received inside said joint, said other part of said joint being rotatable with respect to said one part thereof to move the slot of said other part out of lateral alignment with the slot of said one part whereby to releasably lock said guard on the insulator and the conductor and to completely encircle a portion of the conductor; and a line guard adapter attached to the laterally outer end of said other part of said joint and adapted to be moved with said other part.

* * * * *